May 8, 1934.  C. MARGUGLIO  1,957,896

AIRCRAFT AND PROPULSION MEANS THEREFOR

Filed Aug. 12, 1931  2 Sheets-Sheet 1

DIRECTION OF MOTION

Christopher Marguglio,
INVENTOR-

BY John P. Chandler
ATTORNEY-

May 8, 1934.     C. MARGUGLIO     1,957,896
AIRCRAFT AND PROPULSION MEANS THEREFOR
Filed Aug. 12, 1931     2 Sheets-Sheet 2
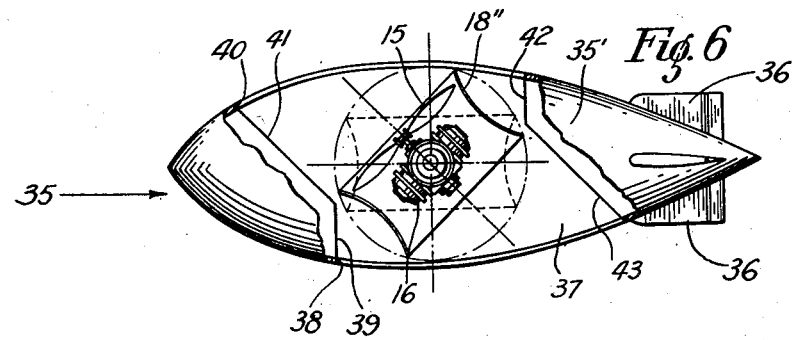
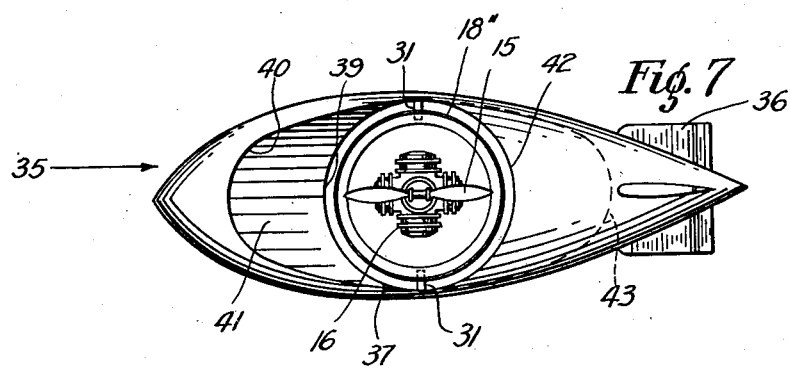
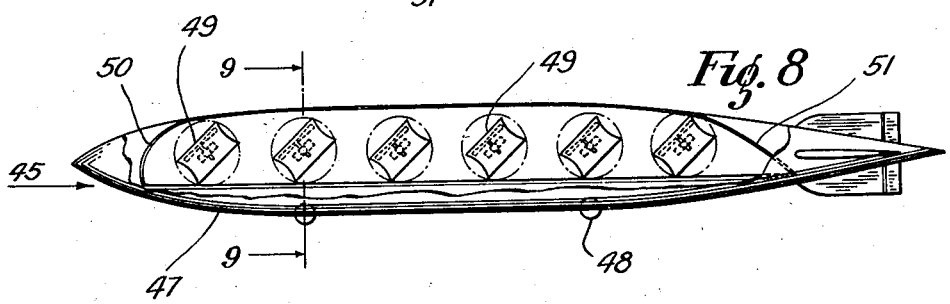
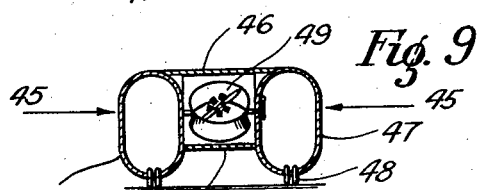
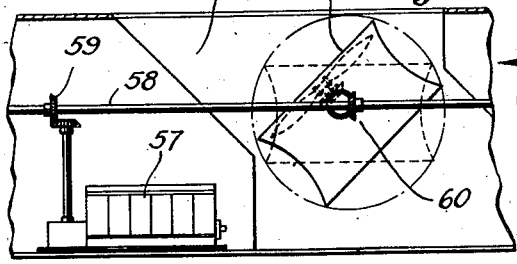
Christopher Marguglio,
INVENTOR
BY John P. Chandler
ATTORNEY Patented May 8, 1934

1,957,896

UNITED STATES PATENT OFFICE 1,957,896

AIRCRAFT AND PROPULSION MEANS THEREFOR

Christopher Marguglio, New York, N. Y.

Application August 12, 1931, Serial No. 556,495

2 Claims. (Cl. 244—18)

This invention relates to propulsion means, particularly for aircraft, and constitutes an improvement on, and a continuation in part of my co-pending application for "Reaction propulsion means", Serial No. 490,831, filed Oct. 24, 1930, the present application relating also to a particular kind of aircraft to be employed in combination with the propulsion means.

Heretofore practically all aircraft of the heavier-than-air variety have been propelled horizontally by means of a propeller revolving at substantially right angles to the direction of horizontal motion, the vertical or ascending movement being attained by virtue of the rapid forward movement of the craft creating a vacuous area on the upper side of the specially formed wings. The principal objection to this type of craft is in the relatively extensive area required for taking-off and for landing, together with the well-known hazards attendant upon taking-off and landing.

The autogiro has somewhat reduced these difficulties by utilizing a separate or auxiliary rotating device to aid in taking-off and landing, and efforts are being made to produce a practical craft of the helicopter type to accomplish a similar result. In both these two latter types of craft, however, an individual propulsion unit is required for horizontal movement and a separate and distinct means is employed to gain altitude as well as to aid in safely reducing the altitude, and landing.

In my co-pending application for "reaction propulsion means", I have described a device which operates on the principle of the reaction of a column of air when driven, within a confined area, against a reaction plate, the air then being allowed to escape in the direction opposite from its original movement, thereby producing great driving force. This single or unitary means, as therein described, is adapted to propel the craft both horizontally and vertically, and the latter without employing conventional wings. This device, in effect, accomplishes three principal things. By the directional application, from the horizontal plane to the vertical plane, or vice versa, of the resultant reaction obtained in the apparatus, the device first overcomes the air resistance met by vehicles moving in the horizontal plane; second, for lifting in the vertical plane, vehicles, or more specifically, aircraft, thereby overcoming completely the weight of said flying machine without the aid of conventional wings or lighter-than-air gases; thirdly, the device overcomes the combined gravity and air resistance, considered as components, of aircraft, by applying the proper direction and magnitude of the resultant of the two components, according to the law of the parallelogram of forces.

In the present invention I likewise accomplish the same three objects above stated, utilizing however in a special manner, the principle of direct action of a column of air created by a revolving propeller, rather than the principle of reaction, as in the previous application.

My present device, in its preferred form, includes a conventional airplane propeller and engine for revolving same, both of which are rigidly mounted within a cylindrical member which is open at both ends. The cylindrical member is pivotally mounted within a special type of aircraft which will be hereinafter described. This pivotal mounting of the cylindrical member permits the propeller to revolve at any desired plane between a vertical and horizontal position depending upon the load of the craft and upon the forward speed desired. Thus, when taking-off, the propeller may be caused to revolve on an almost horizontal plane, thereby devoting practically all of its energy to causing the craft to rise vertically, or substantially so. As the desired altitude is attained, the propeller is inclined more towards the vertical plane, thereby causing the craft to move horizontally.

The open cylindrical member which encloses the propeller, the latter revolving at or near the forward end of said member, serves not only to confine and concentrate the column of air and to give it its proper directional movement, but also to produce greater efficiency in the propeller.

Whereas the propulsion device constructed in accordance with my invention may be employed in connection with any type of aircraft I prefer to employ a rigid elliptically shaped craft provided with a substantially large vertical opening from the upper to the lower portion of the craft. The propulsion device is pivotally mounted within this opening, and as the propeller revolves the air is drawn in through the cylindrical member and the compressed column of air is forced outwards through the lower end of the vertical opening.

Another object of the invention is to provide a propulsion device of the kind above referred to, in combination with the aforementioned type of craft, wherein a perfectly balanced aircraft is provided, and without the use of conventional wings which are relatively fragile things, the craft being more rugged and safe, requiring little special training for the aviator.

The invention also contemplates the provision of an aircraft and propulsion means therefore, wherein the speed of the craft may be unlimited.

Still another object of the invention is to provide an aircraft and propulsion means wherein the craft will be capable of flying at higher speeds in the higher altitudes than in the lower altitudes, the craft being so constructed as to take advantage of the higher and thinner air.

Other objects and advantages of the invention will be hereinafter specifically pointed out, or will become apparent, as the specification proceeds.

With the above indicated objects in view, the invention resides in certain novel constructions and combinations and arrangements of parts, clearly described in the following specification and fully illustrated in the accompanying drawings, which latter show embodiments of the invention as at present preferred.

In said drawings:

Fig. 6 is a side elevation of a preferred type of craft, partially in section, and showing the position of the propulsion means within the craft.

Fig. 7 is a top plan view of same.

Fig. 8 is a side elevation of a modified form of craft provided with a plurality of the propulsion devices.

Fig. 9 is a transverse vertical section or line 9—9 of Fig. 8, looking in the direction of the arrows.

Fig. 10 illustrates a modification in the construction of the device.

Figure 1:
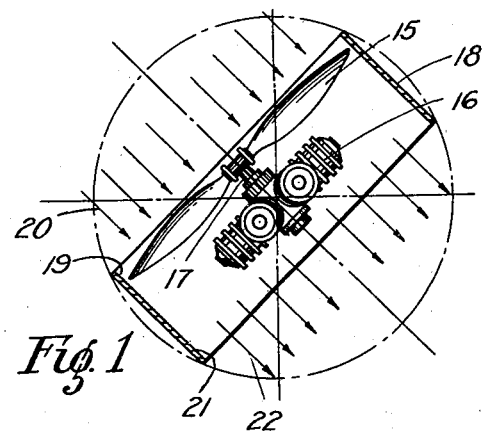
Fig. 1 is a side elevation of the propulsion device, partially in section, the view illustrating particularly the principle of the invention.

Referring now to said drawings by reference numerals, the propulsion device, as at present preferred, includes a conventional airplane propeller 15, a motor 16, preferably of the radial type, having a shaft 17 which carries said propeller, the motor being rigidly mounted within a cylindrical member 18 which is provided with parallel sides and is open at both ends. The propeller is desirably positioned within the cylindrical member so that its plane of revolution is at or near the forward end 19 of the cylindrical member. It will be appreciated that when the propeller is rapidly revolving the outer air, indicated by the arrows 20 is drawn into the cylindrical member, is concentrated and compressed, and is forced out of the rear end 21 of the cylindrical member under great pressure, the arrows 22 indicating the air passing outwards.

Figure 2:
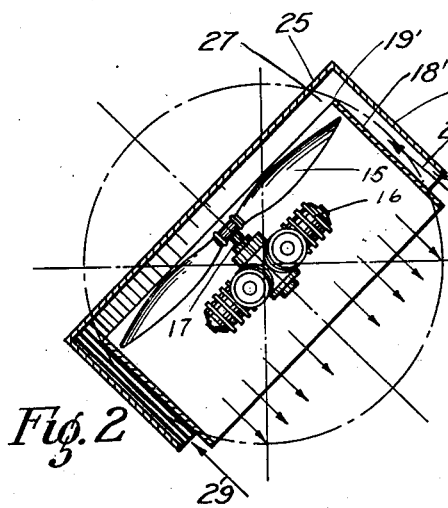
Fig. 2 is similar to Fig. 1 but shows a modification of the principle of the invention wherein the air is drawn in from the rear of the device.

The device shown in Fig. 2 is similar to the preferred form except that an outer cylindrical structure 23, having a rear open portion 24 and a forward closed end portion 25 is rigidly mounted concentric of the cylindrical member 18, the outer cylindrical member being sufficiently large to provide an annular space 26 between said cylindrical members, a space 27 likewise being provided between the forward end portion 19 of the cylindrical member 18 and the closed end portion 25 of the outer cylindrical member 23. As the propeller is revolved, the air, instead of being drawn in from the forward end of the cylindrical member 18, as in the preferred embodiment, is drawn in through the annular space 26 between the concentric cylindrical members 18 and 23, the passage of the air being indicated by the arrows 29. The peculiar advantage of this structure will be hereinafter pointed out.

Figure 3:
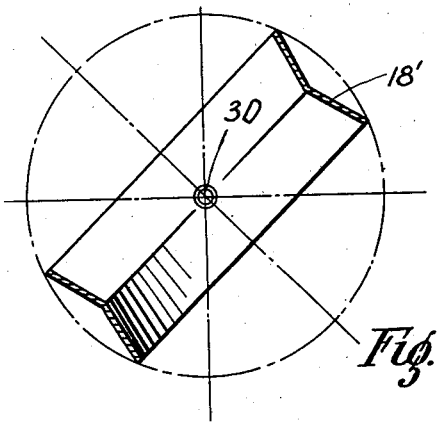
Fig. 3 is a vertical section of a modification in the construction of the cylindrical member.
Figure 4:
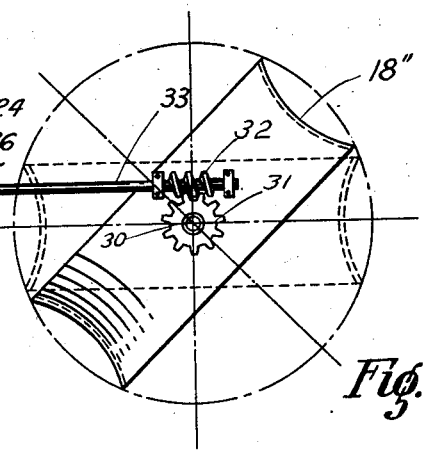
Fig. 4 shows a side elevation of a still further modification in the construction of the cylindrical member and showing the preferred means for revolving the latter.

In Figs. 3 and 4 the cylindrical members 18' and 18", respectively are provided with non-parallel sides, the member 18' being constructed as two opposed conical sections and the walls of the member 18" being substantially arcuate in cross-section. In employing either of these two latter forms it has been found that the air is given a greater compression than when the cylindrical member is provided with parallel sides.

A pivot member 30 is provided on each side of the cylindrical member, said pivot members being positioned in the center of gravity of the propulsion device in order that no change of balance of the craft is effected by the change of plane of revolution of the propeller.

The following means are preferably employed to rotate the device to the desired plane. A gear 31 is secured to the outer side of the cylindrical member at the pivot point, said gear being engaged by a worm gear 32 carried on a shaft 33, the shaft being caused to revolve by conventional mechanical means (not shown). Thus, as the shaft is turned the cylindrical member, carrying the engine and propeller, is turned to the desired plane.

Figure 5:
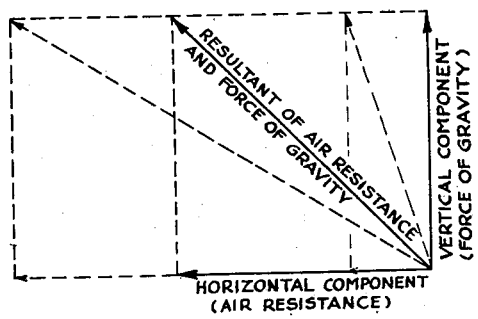
Fig. 5 is a diagram illustrating the law of the parallelogram of forces in its relation to the present invention.

In Fig. 5 I have shown a diagram of the law of the parallelogram of forces in its relation to the present invention. The vertical component, which is the force of gravity, is readily calculable in any given instance, it being the weight of the craft, and since this factor is always constant, except for such factors of depletion of fuel supply, etc., its representation on the diagram is always constant, or substantially so. The horizontal component, which is the air resistance, is not constant and is more difficult of calculation because of the plurality of individual factors involved, such as the speed and direction of the wind, the desired speed of the craft, etc. The resultant of the air resistance and the force of gravity, indicated by the diagonal line, is accordingly variable with the variable horizontal component, as when greater speed is desired the resultant line is longer.

When I am taking off in a craft equipped with my propulsion device I incline the propeller to an almost horizontal plane of rotation, thereby imparting a substantially vertical lifting effect to the craft. As I desire to accumulate forward speed I slowly incline the propeller towards the vertical plane of rotation, the conventional angle for cruising speed being substantially forty-five degrees. It will be appreciated, however, that, given a motor of practically unlimited power and speed the speed of the craft may be unlimited because, since the vertical component is always constant, all the power in the propeller in excess of the amount necessary to satisfy the vertical component necessarily goes to the horizontal component, to overcome the resistance of the air. Thus, there are no limitations to the speed of the craft as there are in the conventional type of airplane.

In Figs. 6 and 7 I have illustrated one type of craft which, in combination with my propulsion means, gives unusual results. The craft, which is designated by the numeral 35 is of the rigid type and is substantially elliptical in shape. It is provided with a suitable framework (not shown), a covering 35', conventional fins and rudders 36, both vertical and horizontal, in the rear.

The craft is provided with an opening extending from the upper to the lower portion thereof. The sides 37 of the opening are substantially flat and vertical whereas the front portion thereof is curved and is vertical for approximately a third of its distance from the base, 38, as indicated at 39, and is then diagonal to the upper surface 40, as indicated at 41. The rear of the opening, likewise curved, is vertical, as shown at 42, for approximately a third of its distance from the upper surface and then extends diagonally rearwardly as indicated at 43.

The propulsion device is mounted within the opening on the pivot members 31 in order that the cylindrical member 18", carrying the motor 16 and the propeller 15, may be rotated to the desired plane, the forward diagonal portion 41 of the vertical opening providing a clear passage for the incoming air, when the propeller is revolving at an angle of 45° as shown in Fig. 6, and the rearward diagonal portion 43 providing a clear passage for the outgoing column of air.

In Figs. 8 and 9, I have illustrated a modified form adapted for use with the propulsion device.

In this instance I employ two relatively long elliptically shaped craft 45 which are rigidly connected parallel with each other, though spaced apart, as illustrated in Fig. 9. A plurality of cross-bars 46 provide the means for joining the two crafts together. Both of the latter are provided with suitable framework (not shown) and preferably a metal covering 47 in order that the device may alight on water, although a plurality of wheels 48 are also provided in order that the craft may alight on the ground as well.

The ship is equipped with a plurality of the propulsion devices 49, similar to that shown in Figs. 6 and 7. In order to cut down the wind resistance of the central propulsion device a streamlined cowling member 50 is provided near the forward end of the craft and another similar member 51 is provided at the rear.

This type of craft, having a plurality of propulsion devices, is possibly somewhat more safe than the craft illustrated in Figs. 6 and 7 wherein only one propulsion unit is provided. However, suitable parachute means may be provided for the latter craft in order that it may safely descend, should the motor fail. Both types of craft are considerably safer than the conventional type of airplane since a perfect balance is always preserved, even though ice should accumulate on the outer covering. In the event of this happening a slight change in the plane of revolution of the propeller will adjust the balance of the craft. In other words, even though an accumulation of ice on the craft will slightly alter the shape thereof, the balance of flying qualities are not disturbed since these things are not dependent upon the shape of the craft, as is true on the conventional planes with specially constructed wings.

In Fig. 10 I have shown a method of employing a single power unit to drive a plurality of the propulsion devices. In this instance the craft, which is designated by the numeral 55, is similar to the craft shown in Figs. 6 and 7, but is longer and is provided with a plurality of the vertical openings 56 extending from the upper to the lower surface of the body. A power unit 57 drives a main shaft 58 by means of gears 59, the main shaft driving the propeller 15 by means of a second set of gears 60.

The hereinbefore described construction admits of considerable modification without departing from the invention; therefore, it is the wish not to be limited to the precise arrangements shown and described, which are as aforesaid, by way of illustration merely. In other words the scope of protection contemplated is to be taken solely from the appended claims, interpreted as broadly as is consistent with the prior art.

What I claim is:

1. A device of the class described including, in combination, an elliptically shaped, heavier-than-air craft and a tiltable propulsion unit therefor, said aircraft having an opening extending from the upper to the lower surface thereof, the side walls of said opening being substantially vertical, the front and rear walls of the opening being concave and extending downwardly and rearwardly, the propulsion unit including a cylindrical member, the side walls of which are concave in longitudinal cross section, said cylindrical member being pivotally mounted within said opening at substantially the center thereof, the pivot member passing through the center of the cylindrical member, a propeller mounted within said cylindrical member, and positioned to rotate adjacent to the forward end thereof, an engine mounted within the cylindrical member at the center thereof and adapted to rotate the propeller, and means for tilting the cylindrical member to the desired angle.

2. In combination, an elliptically shaped, heavier-than-air craft and a tiltable propulsion unit therefor, said air craft having an opening extending from the upper to the lower surface thereof, the side walls of said opening being substantially vertical and the front and rear walls of the opening extending downwardly and rearwardly, the propulsion unit including a cylindrical member, the side walls of which are concave in longitudinal cross section to form a reduced or throat portion midway between the ends thereof, said cylindrical member being pivotally mounted within the opening in the craft at substantially the center thereof, the pivot member passing through the center of cylindrical member, a propeller mounted within said cylindrical member and positioned to rotate adjacent to the forward end thereof, an engine mounted within the cylindrical member at the center thereof and adapted to rotate the propeller, and means for tilting the cylindrical member to any desired angle, said means including a gear carried by the pivot member and secured to the cylindrical member and a worm gear engaging the former gear, whereby, when the worm gear is revolved, the cylindrical member will be tilted.

CHRISTOPHER MARGUGLIO.